United States Patent [19]

Salladay et al.

[11] Patent Number: 4,617,048
[45] Date of Patent: Oct. 14, 1986

[54] SODIUM BENTONITE-UAN SUSPENSION WITHOUT CHEMICAL DISPERSANTS

[75] Inventors: David G. Salladay, Decatur; Donald L. Kachelman, Florence, both of Ala.

[73] Assignee: Tennessee Valley Authority, Muscle Shoals, Ala.

[21] Appl. No.: 769,060

[22] Filed: Aug. 26, 1985

[51] Int. Cl.$^4$ .............................................. C05C 9/00
[52] U.S. Cl. ...................................... 71/30; 71/64.08; 71/904
[58] Field of Search ..................... 71/28.30, 64.08, 904

[56] References Cited

U.S. PATENT DOCUMENTS

| | | | |
|---|---|---|---|
| 3,096,170 | 7/1963 | Newsom, Jr. | 71/64.08 |
| 4,081,266 | 3/1978 | MacKinnon | 71/64.08 |
| 4,230,479 | 10/1980 | Richardson | 71/30 |
| 4,439,223 | 3/1984 | Boles et al. | 71/30 |

Primary Examiner—Ferris H. Lander
Attorney, Agent, or Firm—Robert A. Petrusek

[57] ABSTRACT

A process for producing urea ammonium nitrate (UAN) sodium bentonite suspension from hot urea solution, hot ammonium nitrate solution and dry solid sodium bentonite clay. The dry sodium bentonite clay is added directly to the hot urea solution without the use of expensive chemical dispersants. There is no need for intermediate processing steps involving the dispersion of clay in water, said water normally containing expensive chemical dispersants. After the sodium bentonite has been dispersed in the hot urea solution, then, and only then can the hot ammonium nitrate solution be added. Unexpectedly, the order of addition of the feed material to this process is highly critical. This economical and innovative production process is readily adaptable to existing commercial nitrogen fertilizer production plants and has solved many of the problems which have kept sodium bentonite from being widely used in the production of suspension fertilizers.

16 Claims, 1 Drawing Figure

MIX EQUIPMENT FOR UREA AMMONIUM NITRATE SUSPENSION WITH BENTONITE CLAY

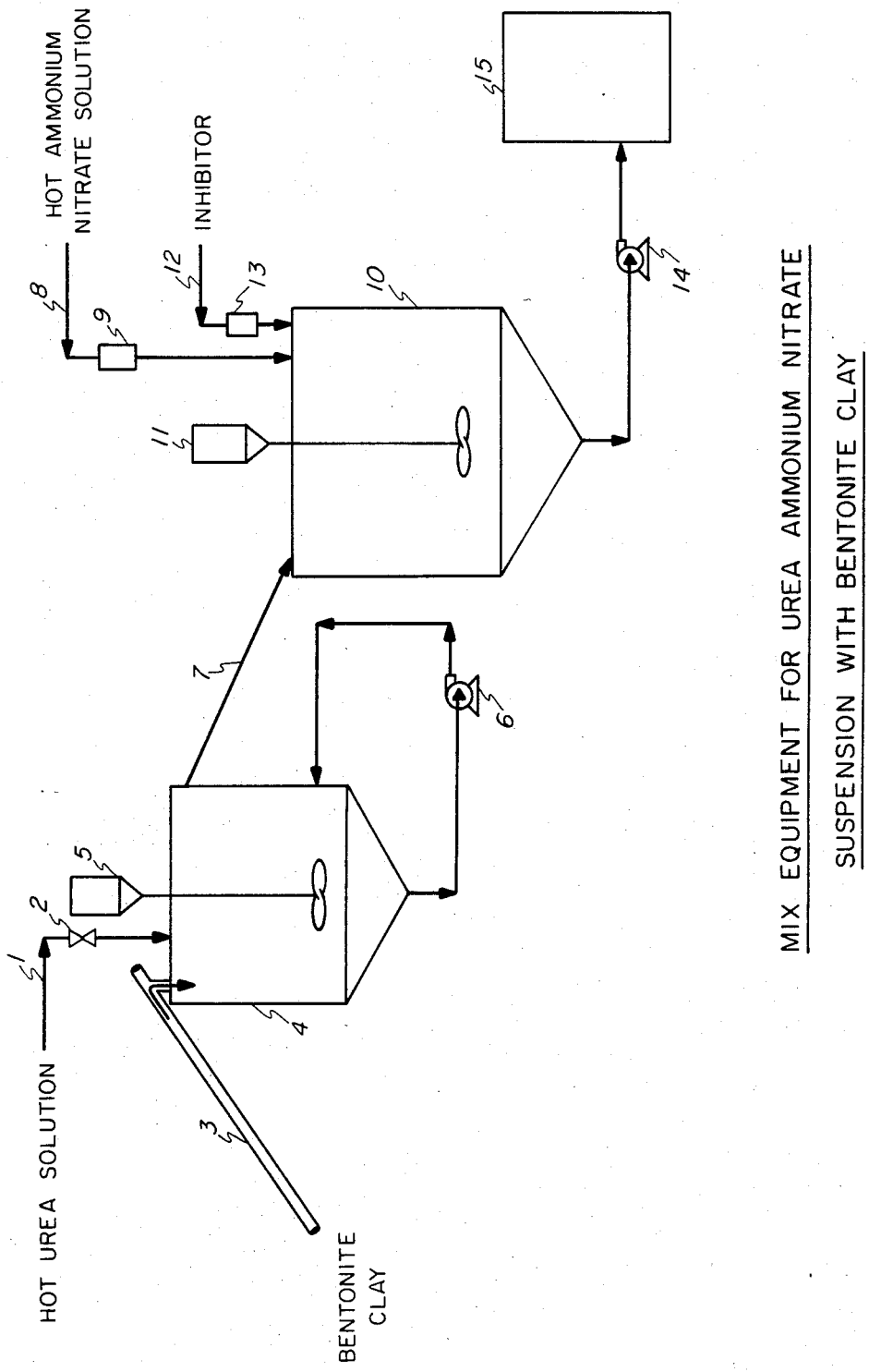

SODIUM BENTONITE-UAN SUSPENSION WITHOUT CHEMICAL DISPERSANTS

The invention herein described may be manufactured or used by or for the government for governmental purposes without payment to us of any royalty thereafter.

INTRODUCTION

The present invention relates to an improvement in the production of UAN clay suspensions prepared from mixtures of urea solution, ammonium nitrate solution, and dry sodium bentonite clay.

UAN suspensions, which are actually eutectic urea-ammonium nitrate solutions containing 1 to 3 percent of bentonite clay, are both a source of supplemental nitrogen and a source of readily usable predispersed gelling clay. At the present time, about eight and one-half million tons of UAN solution are produced in the United States each year.

Our new process provides for the direct incorporation of dry bentonite clay in UAN clay suspensions. It utilizes the normally produced hot concentrated urea solutions with sodium bentonite clay dispersed therein. The new process of the instant invention produces UAN suspensions that can be maintained with the eutectic urea ammonium nitrate composition. It does not involve the use of expensive chemical dispersants such as sodium acid pyrophosphate or tetrasodium pyrophosphate. Our new process is directly applicable to the hot concentrated urea and ammonium nitrate streams that are produced in urea ammonium nitrate plants now in existence. The successful development of this process is expected to lead to the widespread use of sodium bentonite in suspensions in the Midwest. Sodium bentonite is more economical for use in midwestern suspension markets than are other clay minerals since it is mined locally and is a superior gelling agent as compared with even attapulgite clay in suspensions. Our new process displays the distinct advantage of not introducing water in side streams that are added to the concentrated urea-ammonium nitrate solutions.

BACKGROUND OF THE INVENTION

1. Field of the Invention

About 11 years ago, i.e., TVA 10th Demonstration infra, production technology was developed to produce UAN suspensions with attapulgite clay and the chemical dispersant tetrasodium pyrophosphate (TSPP). About 7 years ago, i.e., TVA 12th Demonstration infra, the process was improved to produce such UAN attapulgite clay suspensions containing TSPP. Work in recent years has shown that sodium acid pyrophosphate (SAPP) could be used to chemically disperse sodium bentonite clay, however, there is an acute economic problem with both of these chemical dispersants in that they cost ten to twenty times as much as the eutectic UAN solution in which they are used. These same dispersants also cost ten to twenty times as much as the attapulgite or sodium bentonite clay. The new technology discussed herein presents an economically advantageous production scheme which mixes dry sodium bentonite clay directly in hot concentrated urea solution. The hot concentrated ammonium nitrate solution can then be added to this urea-clay-water mixture. This new technology is readily adaptable to a nitrogen fluid fertilizer production facility which has these hot concentrated streams of urea and ammonium nitrate. This new simplified technology will greatly reduce the investment cost and operating cost of the processing equipment.

For purposes of this disclosure the term UAN suspensions will be used even though at normally experienced ambient temperatures there are really no suspended crystals. The fluid fertilizer being discussed herein is actually a eutectic solution of urea, ammonium nitrate, and water in the presence of a sodium bentonite clay gel. Since the term UAN suspension is used within the fertilizer industry, the term will continue to be used in this disclosure. For more detailed information on the solubility isotherms and phase boundaries of the ammonium nitrate urea water system, as well as other properties thereof, see any number of references, including *Agricultural Anhydrous Ammonia Technology and Use*, Proceedings of the Agricultural Ammonia Institute, St. Louis, Mo., Sept. 29 and 30, 1965, of the Agricultural Ammonia Institute, Memphis, Tenn., Soil Science Society of America, Madison, Wis., Library of Congress Catalog Card No. 66-25830, specifically, but not necessarily exclusively, pages 46–48.

2. Description of the Prior Art

In U.S. Defensive Publication T911,008, June 5, 1973, Getsinger discusses the gelling of clay directly into UAN solution. The described process produces improved fluid nitrogen fertilizers by the addition of a gelling type clay and utilizing agitation for dispersion of the clay. In this work mechanical agitation is relied upon to disperse and gel the clay in a UAN solution.

In 1974 TVA researchers disclosed infra a method for producing a mixture of water, attapulgite clay, and tetrasodium pyrophosphate which could be added to urea ammonium nitrate solution. In this process a thirty weight percent clay dispersion was added to 34.3 percent nitrogen UAN solution to produce 32-0-0-2 clay. In 1978 a hot processing continuous production scheme was demonstrated by TVA researchers infra.

In this continuous production of UAN suspension, TSPP solution is prepared batchwise by mixing bagged TSPP with water. This 20 percent TSPP solution is fed simultaneously with 75 percent urea solution and water to a dilution funnel. Urea is introduced into and used in the dispersion step to avoid excessive dilution of the product. Temperatures of the TSPP solution and the urea solution are 160° F. and 194° F. (71° C. and 90° C.), respectively. Sufficient water is added in the funnel to reduce the concentration of urea solution to 50 percent urea. This mixture then flows into the clay dispersion tank where attapulgite clay is added. After a retention time of about 8 minutes, material overflows through a trough and is mixed with UAN solution as it enters the clay gelling tank. The clay gelling tank is baffled in such a manner that essentially all of the material passes through the recirculation pump.

SUMMARY OF INVENTION

Prior to the discovery of this instantaneous process for the production of sodium bentonite UAN suspensions, no commercially feasible method was available to accomplish this production technology. Prior work did demonstrate the production of UAN suspensions from attapulgite clay using a chemical dispersant TSPP. Sodium bentonite clay could not be used without the incorporation of expensive sodium acid pyrophosphate dispersant in relatively large quantities and with a considerable water dilution which lowered the final grade of the UAN suspension.

Several new and advantageous features of the instant process over conventional prior art processes are realized in the present invention. Among the advantageous features are: (a) the equipment required for the practice of the instant invention is simple, economical, and easy to operate. This process does not use chemical dispersants such as TSPP or SAPP which costs ten to twenty times as much as the UAN solution or the dry sodium bentonite clay; (b) sodium bentonite clay is the cheapest source of gelling clay in the midwestern United States since the mines are located in Wyoming and South Dakota; (c) the Midwest is also the area where the largest quantity of fertilizer suspensions are made and applied; (d) Sodium Bentonite has a higher gell strength in these UAN suspensions than does attapulgite or sepiolite clay; and (e) No dilution of the feed streams of normally 83 weight percent ammonium nitrate solution or 75 weight percent urea solution is necessary in this process. The dry clay does not bring any water with it into the process as would be the case in the preparation of any predispersion of clay in water. With no additional water added in the process there would be energy savings in the production of any normally encountered grade of UAN suspension, 28 to 32 percent. Our new process is expected to greatly increase the amount of sodium bentonite clay which is used in suspension fertilizers. Prior to the discovery leading to the instant invention, there was not a practical production scheme for bentonite UAN suspensions.

The gist underlying the concept of the instant invention is to effect the combination of the urea solution, ammonium nitrate solution, and bentonite clay, said clay preferably in the form of sodium bentonite, in a particular order or sequence. Although the exact reasons are not codified at this moment, we have discovered that, quite unexpectedly, we can directly combine these three ingredients to result in the production of suspensions eminently suitable for the normally intended uses thereof when, and only when, we combine the sodium bentonite and urea solution, preferably hot urea solution, and then after said combination and thorough mixing to insure dispersion of the clay homogeneously throughout said urea solution, the addition thereto of the ammonium nitrate solution. Any other sequence or permutation simply does not work.

ALTERNATE EMBODIMENT

To those skilled in the art reviewing the spread sheet illustration of the operating parameters of the instant invention infra, it should be abundantly clear that although the preferred operating range is at or near the eutectic composition of the three-phase system, urea, ammonium nitrate, and water, we have shown that if the need arises, the invention may be practiced with compositions and slurrys resulting therefrom over a wide spectrum. For instance, in a situation wherein it is desirable to have essentially an ammonium nitrate suspension, the instant invention may be practiced in the manner wherein as little as about 25 percent of the finished suspension is composed of the components urea solution and/or water and bentonite clay. On the other end of the spectrum wherein it is desired to have as high a grade nitrogen solution/suspension as possible made exclusively from urea as the input nitrogen source, there is proviso in the practice of our invention for such an embodiment by the simple expedience of leaving out the stream of ammonium nitrate normally fed thereto. Depending on the geographical location of the producer/user, under the practice of the prior art a straight urea solution fertilizer is oftentimes thought to be normally limited to about 18 percent to 21 percent nitrogen by weight. In that same climatic environment by pursuing the practice of the instant invention, straight urea solution/suspension can be produced and fully utilized having from about 2 to 12 percentage points more nitrogen by weight than such straight urea solution supra, i.e., a urea suspension of about 23 or 30 weight percent nitrogen. This spread of about 2 to 12 percentage points of our straight urea solution/suspension over the prior art straight urea solution appears to hold throughout the range of geographical climatic conditions that would be encountered within the continental United States. For purposes of clarification, the solution/slurry designation supra is herein utilized for such urea compositions since in the production thereof there will be clay particles therein contributing to the suspension characteristics thereof. However, as those skilled in this art will realize, it is oftentimes important to adjust the weight percent of the urea therein as high as possible to effect a saturated solution when said solution is subsequently utilized in the intended and expected environment, but not so high as to exceed saturation or super saturation and cause the nucleation and precipitation of any substantial amounts of urea crystals therein since the occurrence thereof will deleteriously effect the handling and storage characteristics of such materials.

OBJECTS OF THE INVENTION

A primary object of the instant invention is to discover and develop a method, means, and/or process that would use the hot concentrated streams of urea and ammonium nitrate normally produced in a commercial production facility. As stated above, our new and novel process will readily utilize the 75 weight percent urea solution as well as the 83 weight percent ammonium nitrate solutions produced in such a commercial facility at about 190° F. Our process can utilize feed temperatures in the range of from about said 190° F. down to about ambient temperatures, i.e., about 80° F. This is an important consideration and advantage over processes using attapulgite clay as the gelling agent when it is remembered that attapulgite clay's gelling properties are reduced by temperatures above about 140° F. Sodium bentonite, on the other hand, is not temperature sensitive in these temperature ranges. Another object of the instant invention is that our newly discovered process eliminates the use of expensive chemical dispersants, such as sodium acid pyrophosphate. Still another object of the instant invention is to replace the use of attapulgite clay fertilizer suspensions produced in and for the Midwest by cheaper sodium bentonite clay which is mined nearby.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

DESCRIPTION OF THE DRAWING

The present invention will be better understood from a consideration of the following description taken in connection with the accompanying drawing. The initial flow scheme for the production of urea ammonium nitrate suspension from attapulgite clay is depicted in the proceedings of the 10th Demonstration, Tennessee Valley Authority, National Fertilizer Development Center, entitled *New Developments in Fertilizer Technology*, Oct. 1-2, 1974, Muscle Shoals, Ala., pages 47 and 48. In this initial process a small feed tank receives water and tetrasodium pyrophosphate to produce a TSPP water solution. A dry clay feeder introduces attapulgite clay along with the TSPP water solution to a clay dispersion mix tank. The clay dispersion is fed to a gellation tank along with concentrated urea ammonium nitrate solution fed from the UAN solution storage tank. The concentrated UAN solution when mixed with the clay dispersion produced the on-grade UAN suspension containing 2 percent clay.

The hot mixing scheme used to produce attapulgite clay UAN suspensions, which is an improvement of the cold flow process just supra, is depicted in the proceedings of the 12th Demonstration, Tennessee Valley Authority, National Fertilizer Development Center, Muscle Shoals, Ala., entitled *New Developments in Fertilizer Technology*, Oct. 18-19, 1978, pages 74-79, see particularly pages 76 and 78. In this process bagged tetrasodium pyrophosphate and water are added to the TSPP solution tank wherein the resulting TSPP solution is heated to 160° F. with steam. The hot solution is fed to the dilution funnel along with a urea solution which urea solution is maintained at a temperature of about 194° F. The resulting hot urea TSPP solution is then fed to the dispersing tank along with dry clay fed from the clay feeder. The resulting hot water urea clay TSPP mixture is then fed to the gelling tank where said solution is mixed with UAN solution. The final UAN suspension product is then mixed with a corrosion inhibitor.

For purposes of teaching, disclosing, and claiming the instant invention, the teachings and disclosure in both of said 10th and 12th TVA Demonstrations supra are herewith and hereby incorporated herein by reference thereto. Said references are also noted in both our Field of the Invention section, as well as in our Description of the Prior Art supra.

Referring now specifically to the FIGURE, there is shown one embodiment of our new process which can be used for the production of concentrated UAN sodium bentonite suspensions. Urea solution 1 is metered through a flow meter 2 into dispersion tank 4. Dry sodium bentonite 3 is also added to dispersion tank 4 which is agitated by means of agitator 5 and recirculating pump 6. The resulting well-mixed hot urea solution, urea crystals (if cooling is effected therein to a sufficient degree) and dispersed sodium bentonite clay is fed via line 7 to mix tank 10 which is agitated by agitator 11. Subsequently, and this is of the utmost importance, mix tank 10 receives hot ammonium nitrate solution 8 metered through flow meter 9. Optionally, inhibitor 12 metered through flow meter 13 may also be introduced to mix tank 10. The final urea ammonium nitrate sodium bentonite suspension is directed by means of pump 14 to storage tank 15.

DESCRIPTION OF THE PREFERRED EMBODIMENTS

The instant improved process relates to preparing UAN suspension with dry sodium bentonite clay. Although it has been known for many years that dry bentonite clay cannot be added directly to solutions such as UAN, our new improved process relies on an unexpected result obtained in laboratory research. As illustrated in Table VI, Example V infra, dry sodium bentonite clay was successfully added to hot concentrated urea solution with the urea solution serving as a dispersant for the dry sodium bentonite clay. Our new, novel, and heretofore unknown method relies on our discovery that bentonite clay can be effectively directly utilized in UAN suspensions if, and only if, it is added directly to the warm (80° F.+) or hot (>80° F.+ up to about 260° F.) urea solution, intimately mixed therewith and subsequently admixed with the warm or hot ammonium nitrate solution. The instant, new, novel, and improved process of the instant invention also does not need a side stream of urea, expensive chemical dispersant, clay, and water. Our new, improved process enables eutectic compositions of urea ammonium nitrate to be closely maintained. Our new process can be directly incorporated to existing commercial production plants producing 28 percent, 30 percent, or 32 percent eutectic urea ammonium nitrate solution.

With a successful demonstration of this process in laboratory test and with success in production of 5-gallon quantities of of the sodium bentonite UAN suspensions in the pilot plant, commercial test were arranged. The results of these tests are shown in Table I below.

TABLE I

Commercial Production
UAN Sodium Bentonite Suspension
29-0-0-2C

| Test Number | 1 | 2 | 3 | 4 |
|---|---|---|---|---|
| Batch Size, tons | 6 | 6 | 6 | 8 |
| Formulation, lb/ton (in order of addition) | | | | |
| Urea Solution, 75%, 162° F. | 960 | 960 | 960 | 960 |
| Dry Sodium Bentonite Clay | 40 | 40 | 40 | 40 |
| A/N Solution, 71%, 160° F. | 1000 | 1000 | 1000 | 1000 |
| Mixing Times, min. | | | | |
| After clay addition | 5 | 4 | 25 | 20 |
| After A/N Solution addition | 15 | 2 | 5 | 5 |
| Final Temperature, °F. | | | | |
| Urea-clay-water mixture | 158 | 158 | 150 | 152 |
| Mix Tank Agitator Used | yes | yes | yes | yes |
| Recirculation Pump Used | no | yes | yes | yes |
| Passes through Pump[a] | — | 2.5 | 12 | 10 |
| Initial Viscosity[b], cps, 80° F. | 70 | 160 | 610 | 400 |
| 1 Week Viscosity[b], cps, 80° F. | 65 | 155 | 410 | 285 |
| 1 Week Gel Strength[c] g-cm, 80° F. | 1 | 3.5 | 11 | 6 |

[a]Pump Capacity 275 gpm
[b]Measured with Brookfield Viscometer, Model RVT, 100 rpm Spindle No. 4
[c]Measured with gelometer.

A total of 26 tons of 29-0-0-2 weight percent sodium bentonite clay material was produced. These commercial tests were carried out in a production facility which contained an 8-ton capacity mix tank. Tests 4 and 3 show that even with a low number of pump passes, i.e., 10 and 12 respectively, good quality UAN suspension was produced. The direct addition of dry clay to hot urea solution was employed. In this commercial test work, transport trucks were used to bring the hot urea and hot ammonium nitrate solution to the test facility 75 miles from the commercial nitrogen solution production facility. Although 71 weight percent ammonium nitrate solution was used in these tests, normally produced 83 percent ammonium nitrate solution could be used in large-scale, continuous commercial production. Plans are being made to produce large quantities of UAN sodium bentonite clay suspensions in continuous processing.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope of the instant invention herein taught and disclosed.

It is respectfully noted that Examples I–VI infra are set forth somewhat in the nature of a chronological development. Some of the background involved work by ourselves, while portions thereof reflect the work of other engrossed in developments relating to improving the state of the art for the production of suspension fertilizers, and in particular, urea ammonium nitrate suspensions. In this sense, these examples tend to trace some of the evolution of this art. We could add a plethora of additional examples offered for purposes of negation to illustrate that unless the specific procedures discovered by us and now set forth, taught, described, illustrated, and recited in the claims appended hereto are followed, the objectives of the instant invention can not be achieved. For example, we could include data showing what would happen if the sodium bentonite is added to the ammonium nitrate solution warm or hot rather than being added directly to the warm or hot urea solution. We also could offer numerous examples of the deleterious effects of adding the ammonium nitrate solution to the urea solution prior to the proper dispersal of the sodium bentonite in said urea solution alone. However, we believe that we have made our point that if such variations just mentioned are made from the specific dictates taught and recited herein, then those practicing in such unprescribed manner will find, as we have, that sodium bentonite can not be directly applied in the production of urea ammonium nitrate suspension. Indeed, the only viable alternative to preparing such urea ammonium nitrate suspensions is to literally give up altogether on the utilization of bentonite clay therein and revert back to the use of the less desirable clay mineral attapulgite and then only unless one reverts to the heretofore illustrated and described rather expensive remedies developed in the evolution of the prior art, to wit, the use of less desirable attapulgite clay in combination with rather expensive dispersants such as TSPP or SAPP. The exact mechanism that comes into play when the steps and order thereof of our process are practiced and which effects for the first time the utilization of bentonite as a gelling and/or suspending clay material in the production of ammonium nitrate suspensions, is not completely known to us at this time. What is known to us, however, is that the bentonite must be mixed with the warm or hot urea solution before either of these materials contact the warm or hot ammonium nitrate. For purposes of edification, we have spoken of warm or hot solutions of urea and ammonium nitrate. Those skilled in the art, of course, realize that at least to the material urea solution that for all practical purposes they must be worked with at temperatures elevated above ambient in order that the viscosity thereof is sufficiently decreased to provide for easy and thorough mixing of the sodium bentonite therein. Since in this instance of one embodiment of the instant invention the use of urea solution is being contemplated, the problem of urea melts freezing is not one of concern and therefore, theoretically, accomplishment of dispersal of the bentonite clay in the urea solution could be effected if enough time were available and energy were expended at the temperatures near ambient. However, since the urea solutions oftentimes are directly available at elevated temperatures from the urea ammonium nitrate production facilities, it is strongly urged that they be utilized at said elevated temperatures for purposes of bentonite clay dispersal therein.

EXAMPLE I

Several years ago researchers began studying the use of sodium bentonite clay in currently existing suspension fertilizer systems. As the data in Table II below indicates, sodium bentonite showed very high gel strengths in urea ammonium nitrate, ammonium polyphosphate and ammonium ortho-phosphate suspensions when compared with the same suspensions made with attapulgite or sepiolite clays. The one problem, though, was that the sodium bentonite has to be added to the suspension as a 12 weight percent clay dispersion. The water of dilution in the final grade made such a production scheme commercially unattractive.

TABLE II

Comparison of Various Clays as Suspending Agents in Fluid Fertilizers

| Final Grade Suspension[a] (Initial Grade) | Clay Content, wt % | Gel Strength,[b] g-cm | Viscosity,[c] at 80° F. (28° C.), cP | Pourability,[d] vol % |
|---|---|---|---|---|
| Attapulgite clay | | | | |
| 27.1-0-0 (31-0-0 UAN) | 1.5 | 3.8 | 250 | 100 |
| 10.5-33.3-0 (12-38-0 APP) | 1.5 | 0.8 | 250 | 100 |
| 11.4-33.3-0 (13-38-0 AOP) | 1.5 | 6.8 | 750 | 100 |
| Sepiolite clay | | | | |
| 27.1-0-0 (31-0-0 UAN) | 1.5 | 2.3 | 200 | 100 |
| 10.5-33.3-0 (12-38-0 APP) | 1.5 | 0.4 | 250 | 100 |
| 11.4-33.3-0 (13-38-0 AOP) | 1.5 | 4.5 | 550 | 100 |
| Sodium Bentonite Clay | | | | |
| 27.1-0-0 (31-0-0 UAN) | 1.5 | 11.0 | 410 | 100 |
| 10.5-33.3-0 (12-38-0 APP) | 1.5 | 12.0 | 900 | 100 |
| 11.4-33.3-0 (13-38-0 AOP) | 1.5 | 8.7 | 750 | 100 |

[a]Initial grades were mixed with 12 wt % clay dispersions in water.
[b]Fresh product "as is" gel strength determined as the initial measurement by gelometer.
[c]Viscosity measured with Brookfield Model LVT viscometer operating at 60 r/min using a No. 3 spindle. Viscosity in Pa = cP/1,000.
[d]After mild agitation supplied by gently passing stirring rod around inside of container.

EXAMPLE II

Summarized herein in Table III below are tests that were made to find the best dispersing agent for use with sodium bentonite clay. Sodium acid pyrophosphate is the chemical dispersing agent of choice when using sodium bentonite clay.

TABLE III

Comparison of Phosphate Dispersing Agents in
10 Wt Percent Dispersions of Sodium Bentonite[a]

| Dispersing Agent | Concentration Wt % | Viscosity cps |
| --- | --- | --- |
| Sodium tripolyphosphate (STPP) | 2 | 150 |
| STPP | 1 | 290 |
| STPP | 0.5 | 6025 |
| Sodium acid pyrophosphate (SAPP) | 2 | 130 |
| SAPP | 1 | 165 |
| SAPP | 0.5 | 202 |

[a]American Colloid Agro-Gel-S ® (FD-181)

EXAMPLE III

Some of the work that was done to determine the proper amount of SAPP that should be added to the sodium bentonite clay water mixtures is shown in Table IV below. A 10 weight percent mixture of sodium bentonite clay containing 0.6 percent SAPP with the remainder being water gave good results. Two problems hamper the commercial use of such a 10 percent clay dispersion. The SAPP costs almost twenty times as much as the clay and the 89.4 percent water content would seriously dilute the final grades of suspensions.

TABLE IV

Effect of Concentration of Sodium Acid Pyrophosphate (SAPP)
in 10 Wt Percent Dispersions of Sodium Bentonite

|  | 89.5% Water 10.0% FD-181[a] 0.5% SAPP | 89.5% Water 10.0% FD-181 0.5% SAPP | 89.4% Water 10.0% FD-181 0.6% SAPP | 89.25% Water 10.0% FD-181 0.75% SAPP | 89.0% Water 10.0% FD-181 1.0% SAPP |
| --- | --- | --- | --- | --- | --- |
| Initial viscosity[b] (70° F.) cps | 360 | 340 | 250 | 250 | 185 |
| 1 week viscosity (70° F.) cps | 550 | 550 | 350 | 300 | 150 |
| 1 week pourability[c] (70° F.) % | — | 95 | 95 | 95 | — |
| 1 week viscosity (35° F.) cps | — | 600 | 380 | 290 | — |
| 1 week pourability (35° F.) % | — | 95 | 95 | 95 | — |
| 1 month viscosity (70° F.) cps | 1040 | 740 | 480 | 470 | 670 |
| 1 month pourability (70° F.) % | 95 not uniform[d] | 95 not uniform | 98 | 98 | 98 |
| 1 month viscosity (35° F.) cps | — | 550 | 360 | 320 | — |
| 1 month pourability (35° F.) % | — | 90 not uniform | 95 | 97 | — |

[a]American Colloid sodium bentonite Agro-Gel-S ®
[b]Brookfield Viscometer RVT, 100 rpm, Spindle No. 3, <1000 cps, Spindle No. 4, <2000 cps
[c]Pourability - the percent that pours after a stirring rod is moved two complete turns around the inside of the jar and the jar is tilted to a 45° angle for 30 seconds
[d]Not uniform - pours in blobs

TABLE V

Comparison of MAP Suspensions Using Attapulgite
and Sodium Bentonite Clays

| Grade | 11-33-0-1.0 Clay | | | | 7-21-0-1.0 Clay | |
| --- | --- | --- | --- | --- | --- | --- |
| Raw Materials | | | | | | |
| Water | 396 | 216 | 360 | 180 | 896 | 716 |
| Attapulgite | 20 | — | 20 | — | 20 | — |
| 10% FD-181[b], 1% SAPP | — | 200 | — | 200 | — | 200 |
| 11-55-0 MAP | 1200 | 1200 | — | — | — | — |
| 11-52-0 MAP | — | — | 1270 | 1270 | — | — |
| 10-50-0 MAP | — | — | — | — | 840 | 840 |
| 23-0-0 aqua ammonia | 384 | 384 | 350 | 350 | 244 | 244 |
| Initial viscosity (70° F.) cps | 280 | 310 | 260 | 260 | 280 | 270 |
| 1 week viscosity (70° F.) cps | 500 | 440 | 380 | 440 | 210 | 330 |
| 1 week pourability (70° F.) % | 98 | 98 | 98 | 98 | 98 | 98 |
| 1 week liquor layer (70° F.) % | 0 | 1 | 0 | 0 | 0 | 0 |
| 1 week viscosity (35° F.) cps | 470 | 570 | 720 | 870 | 210 | 260 |
| 1 week pourability (35° F.) % | 98 | 98 | 98 | 98 | 98 | 98 |
| 1 week liquor layer (35° F.) % | 0 | 1 | 0 | 0 | 0 | 0 |

[a]All samples contain 1 wt percent clay
[b]American Colloid Agro-Gel-S ®, sodium bentonite clay

EXAMPLE IV

In this example data, which is summarized in Table V below, indicates good results that were obtained when sodium bentonite clay was used in suspensions produced from MAP. The initial and one week viscosities are comparable when the 11-33-0 and 7-21-0 suspensions are compared, having been made either with attapulgite or bentonite clays. This earlier research shows that bentonite clay performs well in fluid fertilizer suspensions but the problem is how to incorporate the sodium bentonite clay into these suspensions.

EXAMPLE V

With an effort to find the commercially feasible, advantageous way to add sodium bentonite to these suspensions, tests were made to see if the dry sodium bentonite clay could be dispersed into hot urea solution. The results were unexpectedly good and are shown below in Table VI infra. In this example, laboratory data shows the effect of the addition of the dry bentonite clay to 180° F., 75 weight percent urea solution. This discovery is considered a major breakthrough in the widespread use of sodium bentonite clay in suspensions. Fluid fertilizer materials containing already gelled clay are very popular with retail fluid fertilizer dealers. On the other hand suspensions made with attapulgite clay have been well received by fluid fertilizer dealers, but until our discovery there literally was no commercially feasible way to introduce sodium bentonite into fluid fertilizers.

TABLE VI

Urea Ammonium Nitrate Suspensions Using Bentonite Clay[a]

| Raw Materials | Pounds Per Ton | | |
|---|---|---|---|
| | 31-0-0-2.0 Clay | 30.8-0-0-2.5 Clay | 30.6-0-0-3.0 Clay |
| Water | 232 | 230 | 230 |
| Urea (46% N) | 696 | 690 | 685 |
| Bentonite clay | 40 | 50 | 60 |
| Water | 174 | 175 | 175 |
| Ammonium nitrate (35% N) | 858 | 855 | 850 |
| Initial viscosity (cps) (70° F.) | 850 | 950 | 840 |
| 2 week viscosity (cps) (70° F.) | 290 | 320 | 320 |
| 2 week pourability (%) (70° F.) | 100 | 100 | 100 |
| 2 week liquor layer on bottom (%) (70° F.) | 30 | 25 | 20 |
| 2 week gel strength (g-cm) (70° F.) | 19.9 | 19.0 | 17.3 |
| 4 week viscosity (cps) (35° F.) | 220 | 210 | 210 |
| 4 week pourability (%) (35° F.) | 100 | 100 | 100 |
| 4 week liquor layer on bottom (%) (35° F.) | 30 | 25 | 20 |
| 6 week viscosity (cps) (70° F.) | 250 | 260 | 275 |
| 6 week pourability (%) (70° F.) | 100 | 100 | 100 |
| 6 week liquor layer on bottom (%) (70° F.) | 30 | 25 | 20 |

[a] American Colloid's Agro-Gel-S ®

EXAMPLE VI

The UAN-Bentonite clay suspensions in Table VI supra were then tried in a very difficult X:O:X grade suspension fertilizer. Shown below in Table VII are the results when 18-0-18 suspensions were made from the urea ammonium nitrate sodium bentonite suspensions. Although there was some liquor layer on the bottom of the samples containing 1.2 and 1.5 percent clay, this is not considered a problem. The gels formed with sodium bentonite clay are so strong that when air bubbles are trapped in them they will rise somewhat from the bottom of their containers. Although there was a little bit of rising of the gel, the potash crystals were maintained in the gel.

TABLE VII 18-0-18 Suspensions from Urea Ammonium Nitrate Suspensions Using Bentonite Clay[a]

| Raw Materials | Pounds Per Ton | | |
|---|---|---|---|
| | 18-0-10-1.2 Clay | 18-0-18-1.5 Clay | 18-0-18-1.8 Clay |
| Water | 257 | 250 | 242 |
| 31-0-0-2 clay | 1162 | — | — |
| 30.8-0-0-2.5 clay | — | 1169 | — |
| 30.6-0-0-3 clay | — | — | 1177 |
| 0-0-62 | 581 | 581 | 581 |
| Initial viscosity (cps) (70° F.) | 300 | 540 | 460 |
| 1 week viscosity (cps) (70° F.) | 450 | 700 | 570 |
| 1 week pourability (%) (70° F.) | 85 | 98 | 98 |
| 1 week liquor layer on bottom (%) (70° F.) | 20 | 30 | 3 |
| 1 week crystal settling | nil | nil | nil |

[a] American Colloid's Agro-Gel-S ®

INVENTION PARAMETERS

After sifting and winnowing through the data supra as well as other results and operations of our new, novel, and improved method for effecting the production of sodium bentonite-UAN suspensions without chemical dispersants, we now present the principal operating parameters and variables, it being understood that other variables, as considered and discussed supra may alone, or in various combinations be additional viable operation considerations and parameters.

| Variables | Invention Parameters | | |
|---|---|---|---|
| | Limits | Preferred | Most Preferred |
| Feeds | | | |
| Urea Solution | | | |
| % Concentration | 10-88 | 70-80 | 75 |
| Temperature, °F. | 80-260 | 140-180 | 160 |
| Ammonium Nitrate Solution | | | |
| % Concentration | 1-100 | 70-85 | 83 |
| Temperature, °F. | 32-340 | 90-170 | 160 |
| Mixing Times | | | |
| Urea Solution-Clay, min | 5-30 | 20-30 | 30 |
| Urea Solution-Clay-Ammonium Nitrate Solution, min | 5-30 | 5-10 | 10 |
| Agitation of urea solution-clay | | | |
| Tip Speed of Agitator, ft/sec | 20-100 | 80-100 | 100 |
| Tip Speed of Pump Impeller, ft/sec | 20-100 | 80-100 | 100 |
| Passes thru Pump | 10-40 | 30-40 | 40 |
| Product | | | |
| Concentration, % N | 15-38 | 28-32 | 30 |
| Concentration, % Ammonium Nitrate | 0-75 | 40-45 | 42 |
| Concentration, % Urea | 10-65 | 30-35 | 33 |
| Concentration, % Water | 15-68 | 20-30 | 25 |
| Concentration, % Clay | 0.5-6 | 1-3 | 2 |
| Viscosity (cps, 80° F.) | 100-2000 | 300-600 | 400 |
| Gel Strength, (gm-cm, 80° F.) | 1-20 | 10-20 | 10 |
| Pourability (%) | 95-100 | 98-100 | 100 |
| Saturation Temperature, °F. | 0-120 | 10-30 | 20 |
| Product Use | | | |
| Urea-Ammonium Nitrate Sodium Bentonite Suspension in X-O-Y Grade Final Suspension | | | |
| X, % N | 3-36 | 3-36 | — |
| Y, % K$_2$O | 3-36 | 3-36 | — |

While we have shown and described particular embodiments of our invention, modifications and variations will occur to those skilled in the art. We wish it to be understood, therefore, that the appended claims are intended to cover such modifications, and variations which are within the true scope and spirit of our invention.

What we claim as new and desire to secure by Letters Patent of the United States is:

1. A process for the direct production from urea solutions, ammonium nitrate solutions, and bentonite clay of urea ammonium nitrate suspensions having excellent handling and storage characteristics including minimal extended time viscosity decreases, minimal extended time pourability decreases, and substantial freedom from post-production urea crystal growth, said urea-ammonium nitrate suspension being eminently suitable to production steps thereof at temperatures elevated as high as about 260° F. and said suspensions substantially eliminating the requirement for inclusion therein of relatively expensive chemical dispersants, including sodium acid pyrophosphate and tetrasodium pyrophosphate, which process comprises the steps of:

(1) introducing into mixing means a stream of urea solution, said urea solution ranging from about 10 to about 88 weight percent urea and the temperature of said urea solution being in a range from about 80° F. to about 260° F.;

(2) introducing into said mixing means a stream of bentonite clay, said bentonite clay being sodium bentonite and being introduced into said mixing means in predetermined portions such that said bentonite clay comprises from about 0.5 to about 6.0 percent by weight of the combined urea solution bentonite composite;

(3) intimately mixing said streams of urea solution and bentonite clay in said mixing means to effect the homogeneous dispersion of said clay in said solution;

(4) subsequently introducing a stream of ammonium nitrate solution, said ammonium nitrate solution ranging from about 1 to about 100 weight percent ammonium nitrate and the temperature of said ammonium nitrate solution ranging from about 32° to about 340° F., into the resulting homogeneous mixture of urea solution bentonite clay; and (5) removing as product the resulting mixture of urea solution, ammonium nitrate solution, and bentonite-clay as urea-ammonium nitrate suspension;

said process characterized by the fact that the product produced therefrom has an initial viscosity ranging from about 100 cps to about 2000 cps at 70° F., has an initial pourability of at least about 95 percent by volume at 70° F., and after storage for a period of about one month exhibits decreases over said initial viscosity ranging from about 25 percent to 50 percent and decreases in pourability ranging from substantially no decreases thereof to about 3 percent.

2. The process of claim 1 wherein the temperature of said urea solution introduced into said mixing means ranges from about 140° to about 180° F., and the temperature of said ammonium nitrate solution introduced into said resulting mixture of urea solution bentonite clay ranges from about 140° to about 180° F.

3. The process of claim 2 wherein the grade of said suspension fertilizer is in the form of X:O:Y, wherein X may range from about 3 to about 36, and where Y may range from about 3 to about 36.

4. The process of claim 1 wherein the temperature of said urea solution introduced into said mixing means is about 160° F., and the temperature of said ammonium nitrate solution introduced into said resulting mixture of urea solution bentonite clay is about 160° F.

5. The process of claim 4 wherein the grade of said suspension fertilizer is in the form of X:O:Y, wherein X may range from about 3 to about 36, and where Y may range from about 3 to about 36.

6. The process of claim 1 wherein the predetermined amount of said bentonite clay introduced thereinto ranges from about 1 percent to about 3 percent.

7. The process of claim 1 wherein the predetermined amount of said bentonite clay introduced thereinto is about 2 percent.

8. The process of claim 1 wherein said stream of bentonite clay comprises dry particulates thereof.

9. The process of claim 1 wherein the grade of said suspension fertilizer is in the form of X:O:Y, wherein X may range from about 3 to about 36 as N, and where Y may range from about 3 to about 36 as $K_2O$.

10. A process for the direct production from urea solutions and bentonite clay of urea suspensions having excellent handling and storage characteristics including minimal extended time viscosity decreases, minimal extended time pourability decreases, and substantial freedom from post-production urea crystal growth, said urea-ammonium nitrate suspension being eminently suitable to production steps thereof at temperatures elevated as high as about 260° F., which process comprises the steps of:

(1) introducing into mixing means a stream of urea solution, said urea solution ranging from about 10 to about 88 weight percent urea and the temperature of said urea solution introduced into said mixing means ranging from about 32° to about 260° F.;

(2) introducing into said mixing means a stream of bentonite clay, said bentonite clay being sodium bentonite and being introduced into said mixing means in predetermined portions such that said bentonite clay comprises from about 0.5 to about 6.0 percent by weight of the combined urea solution bentonite composite;

(3) intimately mixing said streams of urea solution and bentonite clay in said mixing means to effect the homogeneous dispersion of said clay in said solution; and (4) removing as product the resulting mixture of urea solution and bentonite clay as urea suspension;

said process characterized by the fact that the product produced therefrom has an initial viscosity ranging from about 100 cps to about 2000 cps at 70° F., has an initial pourability of at least about 95 percent by volume at 70° F., and after storage for a period of about one month exhibits decreases over said initial viscosity ranging from about 25 percent to 50 percent and decreases in pourability ranging from substantially no decreases thereof to about 3 percent.

11. The process of claim 10 wherein the temperature of said urea solution introduced into said mixing means ranges from about 140° to about 180° F.

12. The process of claim 11 wherein the grade of said suspension fertilizer is in the form of X:O:O, wherein X may range from about 15 to about 30.

13. The process of claim 10 wherein the temperature of said urea solution introduced into said mixing means is about 160° F.

14. The process of claim 13 wherein the grade of said suspension fertilizer is in the form of X:O:O, wherein X may range from about 15 to about 30.

15. The process of claim 10 wherein the predetermined amount of said bentonite clay introduced thereinto ranges from about 1 percent to about 3 percent.

16. The process of claim 10 wherein the grade of said suspension fertilizer is in the form of X:O:O, and wherein X may range from about 15 to about 30.

* * * * *